F. A. WERNIG.
BRACKET FOR LICENSE NUMBER PLATES.
APPLICATION FILED DEC. 23, 1912.
1,090,897.
Patented Mar. 24, 1914.
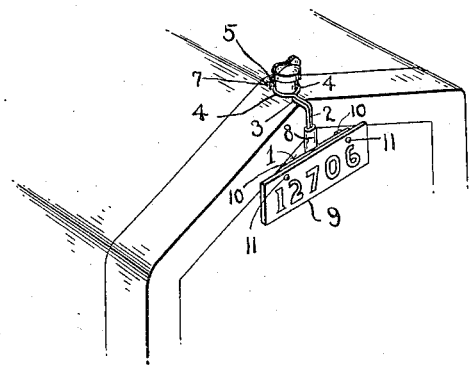
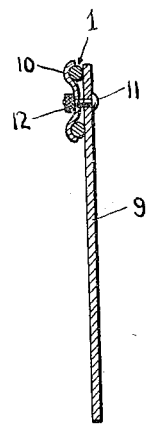
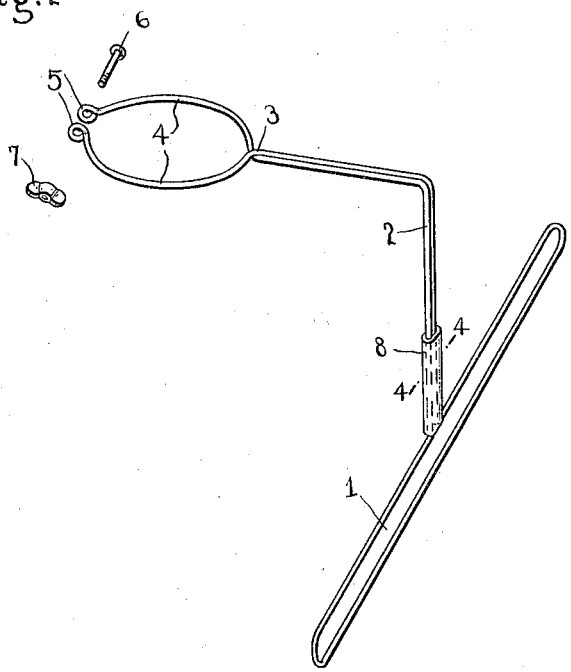
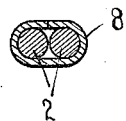
Witnesses
L. B. James
C. E. Hunt
Inventor
Frederick A. Wernig
by H. B. Willson & Co
Attorneys

UNITED STATES PATENT OFFICE.

FREDERICK A. WERNIG, OF NEW YORK, N. Y.

BRACKET FOR LICENSE-NUMBER PLATES.

1,090,897.  Specification of Letters Patent.  Patented Mar. 24, 1914.

Application filed December 23, 1912. Serial No. 738,267.

*To all whom it may concern:*

Be it known that I, FREDERICK A. WERNIG, a citizen of the United States, residing at New York, in the county of New York and State of New York, have invented certain new and useful Improvements in Brackets for License-Number Plates; and I do declare the following to be a full, clear, and exact description of the invention, such as will enable others skilled in the art to which it appertains to make and use the same.

This invention relates to improvements in brackets for attaching license number plates to vehicles.

One object of the invention is to provide a license number bracket which is particularly adapted for attaching the license number plates of automobiles to the caps of the radiators thereof and which may be adjusted to fit caps of different sizes.

Another object is to provide a simple, strong, durable and inexpensive bracket of this character formed from a single wire rod bent into the desired shape.

With these and other objects in view, the invention consists of certain novel features of construction, and the combination and arrangement of parts as will be more fully described and claimed.

In the accompanying drawings; Figure 1 is a perspective view of the front end of an automobile radiator showing the application of the invention for attaching a license number plate to the cap of the radiator; Fig. 2 is a detail perspective view of the bracket; Fig. 3 is a detail vertical sectional view through the number plate and lower portion of the bracket, showing one means whereby the plate may be attached to the bracket; Fig. 4 is a cross sectional view through the lower portion of the bracket taken on the line 4—4 of Fig. 2.

My improved number supporting bracket is constructed from a single wire rod bent midway between its ends to form a narrow elongated horizontally disposed sign engaging loop 1. The ends of the rod after forming the loop are brought together and bent at right angles to form the shank 2 of the bracket. The ends of the rod forming the shank 2 extend in substantially parallel relation for a suitable distance and are then crossed as at 3 and curved in opposite directions to form semi-circular cap engaging arms 4, the ends of which terminate or are bent into eyes 5 adapted to receive a clamping bolt 6 with which is engaged a clamping nut 7 whereby the eyes are drawn together and the arms 4 bent into engagement with the cap of the radiator as clearly shown in Fig. 1 of the drawings.

The ends of the rod forming the shank 2 are bent at right angles substantially midway between the point 3 where they cross and the loop 1 and the lower portions of the rods forming the shank have engaged therewith immediately above the loop 4 a clamping sleeve 8 by means of which the ends of the rod are firmly fastened or held together to form the shank 2. By thus clamping the shank forming ends of the rod together and crossing said ends adjacent to the arms 3 the latter may be sprung apart to a greater or less extent for engaging radiator caps of different sizes to which said arms are securely clamped by the bolt 6 and nut 7 as hereinbefore described.

As clearly shown the lower end of the clamping sleeve 8 is firmly fastened to the shank with its lower end in contact with the loop, to which the sign is adapted to be secured, and when the arms 4 are sprung apart to embrace the cap of the radiator of the automobile the horizontal stretches of the shank will yield to the vertical arms thereof, the location of the sleeve therefore constituting an important feature of the invention, the same not only strengthening and holding the vertical arms of the shank together and in operative position in respect to the loop but also forms a reinforcement for the central portion of said loop whereby the latter is rendered strong and durable.

The license number plate 9 may be secured to the loop 1 in any suitable manner and is here shown as being clamped thereto by a bridge plate 10 the ends of which are curved to fit the opposite sides of the loop 1 and with which and with the number plate is engaged a clamping bolt 11 on which is secured a clamping nut 12 whereby the bridge plate 10 and the number plate 9 are securely clamped to the loop 1 of the bracket.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

The herein described bracket made from a single piece of wire bent at its central portion into a horizontally disposed elongated loop, the two stretches of wires extending side by side upwardly from the loop to form a vertical shank and then bent at right angles and then extending horizontally to the rear and crossing each other and then curved outwardly in opposite directions from where they cross and terminating in eyes, a member engaging with said eyes, a clamping sleeve firmly fastened around the arms forming the vertical shank, the lower end of which is in contact with the loop, whereby the vertical portions of the wire are held firmly together but the upper horizontal portions of the wire may be separated to spring the curved portions about a suitable support, and means for detachably securing a number-plate to the loop.

In testimony whereof I have hereunto set my hand in presence of two subscribing witnesses.

FREDERICK A. WERNIG.

Witnesses:
CHARLES T. CHURCH,
W. S. WERNIG.

Copies of this patent may be obtained for five cents each, by addressing the "Commissioner of Patents, Washington, D. C."